(12) United States Patent
Bearden

(10) Patent No.: US 7,177,164 B1
(45) Date of Patent: Feb. 13, 2007

(54) LOW POWER, HIGH VOLTAGE POWER SUPPLY WITH FAST RISE/FALL TIME

(75) Inventor: Douglas B. Bearden, Melbourne, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/376,632

(22) Filed: Mar. 10, 2006

(51) Int. Cl.
*H02M 3/335* (2006.01)
*H02M 7/537* (2006.01)

(52) U.S. Cl. .................... 363/25; 363/26; 363/132

(58) Field of Classification Search ............. 363/24, 363/25, 26, 17, 98, 132
See application file for complete search history.

(56) References Cited

U.S. PATENT DOCUMENTS

| | | | |
|---|---|---|---|
| 4,034,280 A | 7/1977 | Cronin et al. | |
| 4,042,874 A | 8/1977 | Quinn et al. | |
| 4,486,821 A | 12/1984 | Itakura | |
| 4,661,896 A | 4/1987 | Kobayashi et al. | |
| 4,683,415 A | 7/1987 | Zimmerman | |
| 4,688,161 A | 8/1987 | Covington | |
| 4,988,942 A | 1/1991 | Ekstrand | |
| 5,075,601 A | 12/1991 | Hildebrand | |
| 5,126,652 A | 6/1992 | Carlin | |
| 5,357,418 A | 10/1994 | Clavel | |
| 5,363,288 A | 11/1994 | Castell et al. | |
| 5,486,992 A | 1/1996 | Koscica et al. | |
| 5,708,574 A | 1/1998 | Crompton | |
| 6,127,816 A | 10/2000 | Hirst | |
| 6,166,925 A | 12/2000 | Richter et al. | |
| 6,314,010 B1 | 11/2001 | Markow et al. | |
| 6,366,485 B1 | 4/2002 | Fujisawa | |
| 6,370,039 B1 * | 4/2002 | Telefus | 363/15 |
| 6,381,150 B2 * | 4/2002 | Telefus | 363/15 |
| 6,434,021 B1 * | 8/2002 | Collmeyer et al. | 363/21.01 |
| 6,512,353 B2 | 1/2003 | Sanzo et al. | |
| 6,661,679 B1 | 12/2003 | Yang et al. | |
| 6,728,121 B2 | 4/2004 | Ben-Yaakov et al. | |
| 6,944,034 B1 * | 9/2005 | Shteynberg et al. | 363/21.13 |

\* cited by examiner

*Primary Examiner*—Bao Q. Vu
(74) *Attorney, Agent, or Firm*—James J. McGroary; Ross F. Hunt, Jr.

(57) ABSTRACT

A low power, high voltage power supply system includes a high voltage power supply stage and a preregulator for programming the power supply stage so as to produce an output voltage which is a predetermined fraction of a desired voltage level. The power supply stage includes a high voltage, voltage doubler stage connected to receive the output voltage from the preregulator and for, when activated, providing amplification of the output voltage to the desired voltage level. A first feedback loop is connected between the output of the preregulator and an input of the preregulator while a second feedback loop is connected between the output of the power supply stage and the input of the preregulator.

19 Claims, 2 Drawing Sheets

LOW POWER, HIGH VOLTAGE POWER SUPPLY WITH FAST RISE/FALL TIME

ORIGIN OF THE INVENTION

This invention was made by an employee of the United States Government and may be manufactured and used by or for the Government for governmental purposes without the payment of any royalties.

FIELD OF THE INVENTION

The present invention relates to power supplies and, more particularly, to power supplies which are capable of producing high voltage output voltage having a very fast rise time and fall time.

BACKGROUND OF THE INVENTION

Many different power supplies have been developed over the years for various different applications. One power supply of interest here is an open loop, high voltage power supply that was initially designed for two NASA applications, Solar X-Ray Imager (SXI) and Solar Extreme Ultraviolet Research Telescope Spectrograph (SERTS). This power supply, which uses a pre-regulator, voltage doublers and a preload, generates a high voltage output with a fast rise/fall time and was used to electronically shutter a microchannel plate (MCP) intensified Charge Coupled Device (CCD) by controlling the accelerating voltage across the MCP. This approach has been used successfully in connection with the SXI telescope and in a number of different SERTS flights. However, this power supply is not of universal applicability and there are projects that require a fast rise/fall time that can benefit from use of a power supply based on an improved or different approach.

SUMMARY OF THE INVENTION

In accordance with one aspect of the invention, high voltage power supply is provided which is of a multi-loop configuration and which is capable of producing a high voltage output having a fast rise time and a fast fall time. More specifically, in a preferred embodiment, the power supply can be implemented to provide an output voltage having a rise time of less than 100 μs and a fall time of less than 100 μs at loads of 300 μA or less, making the power supply particularly suitable for the applications discussed above as well as other applications requiring similar characteristics.

In accordance with a further aspect of the invention, a low power, high voltage power supply system, said power supply system comprising:

a high voltage power supply stage;

a preregulator for programming the power supply stage so as to produce, at an output thereof, an output voltage which is a predetermined fraction of a desired voltage level;

said power supply stage including a high voltage stage connected to receive the output voltage from the preregulator and for, when activated, providing amplification of said output voltage to said desired voltage level so that a voltage of said desired voltage level is presented at an output terminal of said power supply stage;

a first feedback loop connected between said output of said preregulator and an input of said preregulator; and a second feedback loop connected between said output terminal of said power supply stage and said input of said preregulator.

Preferably, the power supply stage includes a high voltage pulse width modulator for controlling amplification of the output voltage of said preregulator supplied to said power supply stage.

The power supply stage preferably includes a voltage doubler circuit comprising first and second voltage doublers. Preferably, the voltage doubler circuit includes a transformer having first and second primary windings and first and second secondary windings. The voltage doubler circuit preferably includes first and second electronic switches which are turned on and turned off under the control of said high voltage pulse width modulator. Advantageously, the first and second switches each comprises a field effect transistor.

Preferably, the power supply stage further comprises a series combination of a resistor and capacitor connected between a junction between said first and second electronic switches and a junction between said first and second primary windings of said transformer, output connections from the preregulator being connected across said capacitor, and the resistor serving to limit current flow in the voltage doubler circuit by controlling the drive voltage of the first and second electronic switches during turn on of the electronic switches.

Preferably, the high voltage power supply stage further comprises a first capacitor connected across the first secondary winding, a second capacitor connected across the second secondary winding, a third capacitor connected in series between said first and second capacitors and a fourth capacitor connected in series with the first, second and third capacitors between the second capacitor and ground, an electronic control switch connected across each of said first, second, third and fourth capacitors for controlling discharging of said capacitors to produce said desired voltage at said output terminal of said high voltage power supply stage, and a control circuit for controlling switching of the electronic control switches. Preferably, on/off circuitry is connected to said high voltage pulse width modulator and said control circuit for controlling activation thereof.

Preferably, the preregulator includes a preregulator pulse width modulator, and the first feedback loop is connected to an input of said preregulator pulse width modulator.

In accordance with another aspect of the invention, there is provided a low power, high voltage power supply apparatus comprising:

a high voltage power supply; and a preregulator for programming the power supply to provide an output voltage which is a predetermined fraction of a desired output voltage, said preregulator comprising a preregulator pulse width modulator, a preregulator power stage and a preregulator output;

said high voltage power supply having a high voltage output activated after the desired output voltage is set and including a high voltage power stage, connected to the preregulator output, for providing amplification of the output voltage produced by the preregulator to the desired output voltage; and said power supply apparatus further comprising a first feedback loop connected between the preregulator output and the preregulator pulse width modulator for controlling the output of the preregulator; and a second feedback loop connected between said high voltage output of the high voltage power supply and the preregulator pulse width modulator for controlling the high voltage output after the high voltage output is activated.

Further features and advantages of the present invention will be set forth in, or apparent from, the detailed description of preferred embodiments thereof which follows.

DESCRIPTION OF THE PREFERRED EMBODIMENTS

Figure 1:
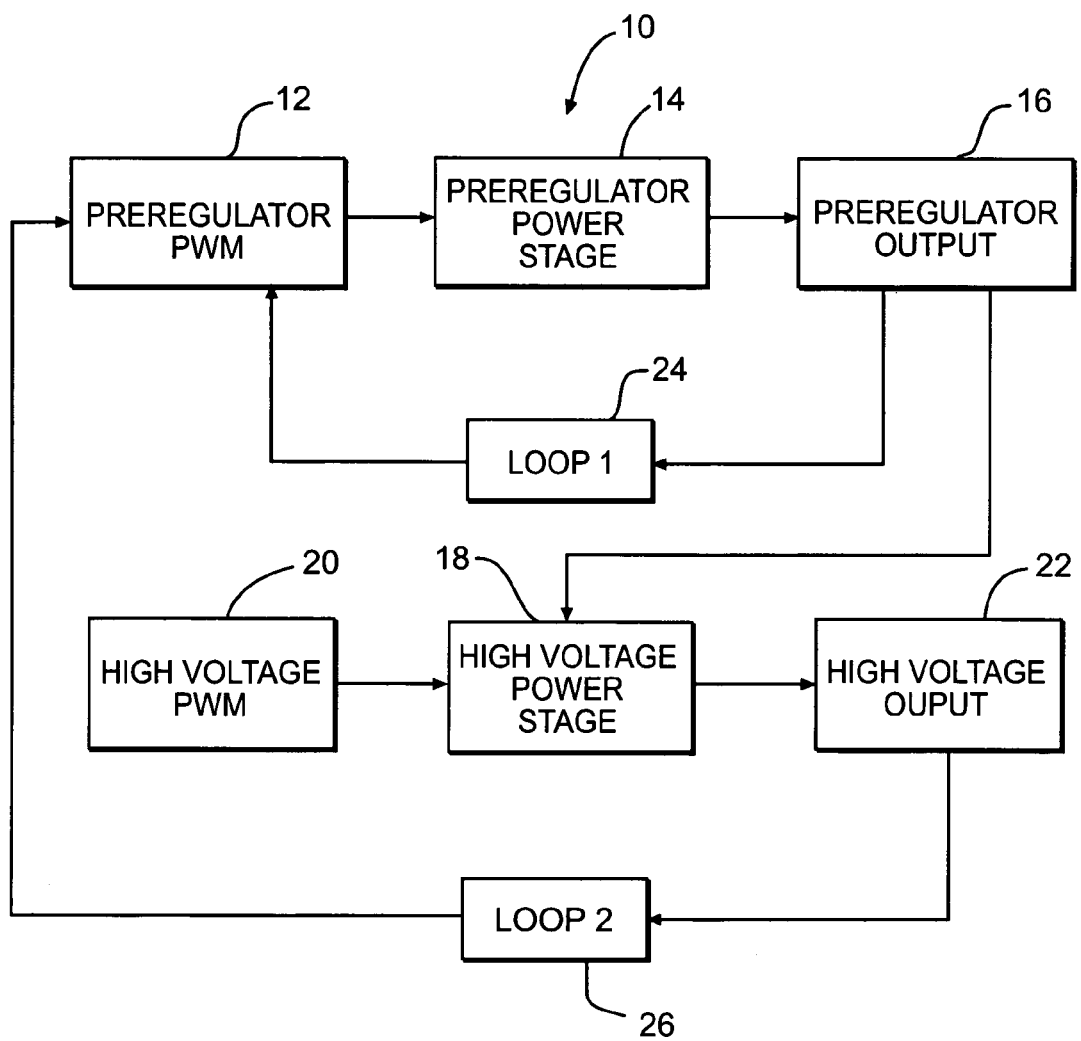
FIG. 1 is a block diagram of a high voltage power supply in accordance with a preferred embodiment of the invention.

To provide a brief overview, and as is discussed in more detail below, in the preferred embodiment under consideration, a pre-regulator stage, indicated at 10 in FIG. 1 and comprising a preregulator pulse width modulator (PWM) 12, a preregulator power stage 14, and a preregulator output 16, is used to program a high voltage power stage or high voltage power supply, indicated generally at 18, to produce a voltage which is a fraction (e.g., in a preferred non-limiting example 1/30 in the specific non-limiting example under consideration) of the desired output voltage. After this desired voltage has been set, a high voltage pulse width modulator (PWM) 20 is enabled and the preregulator voltage is amplified to restore the voltage to its original level (e.g., by amplifying the preregulator output voltage by 30 in the specific non-limiting example under consideration) to produce a high voltage output indicated at 22. A first feedback loop 24 (loop 1) is connected between the preregulator output 16 and the preregulator PWM 12 and a second feedback loop 26 (loop 2) is connected between the high voltage output 22 and preregulator PWM 12. The details of the amplification stage and other aspects of the invention are set forth below.

Figure 2:
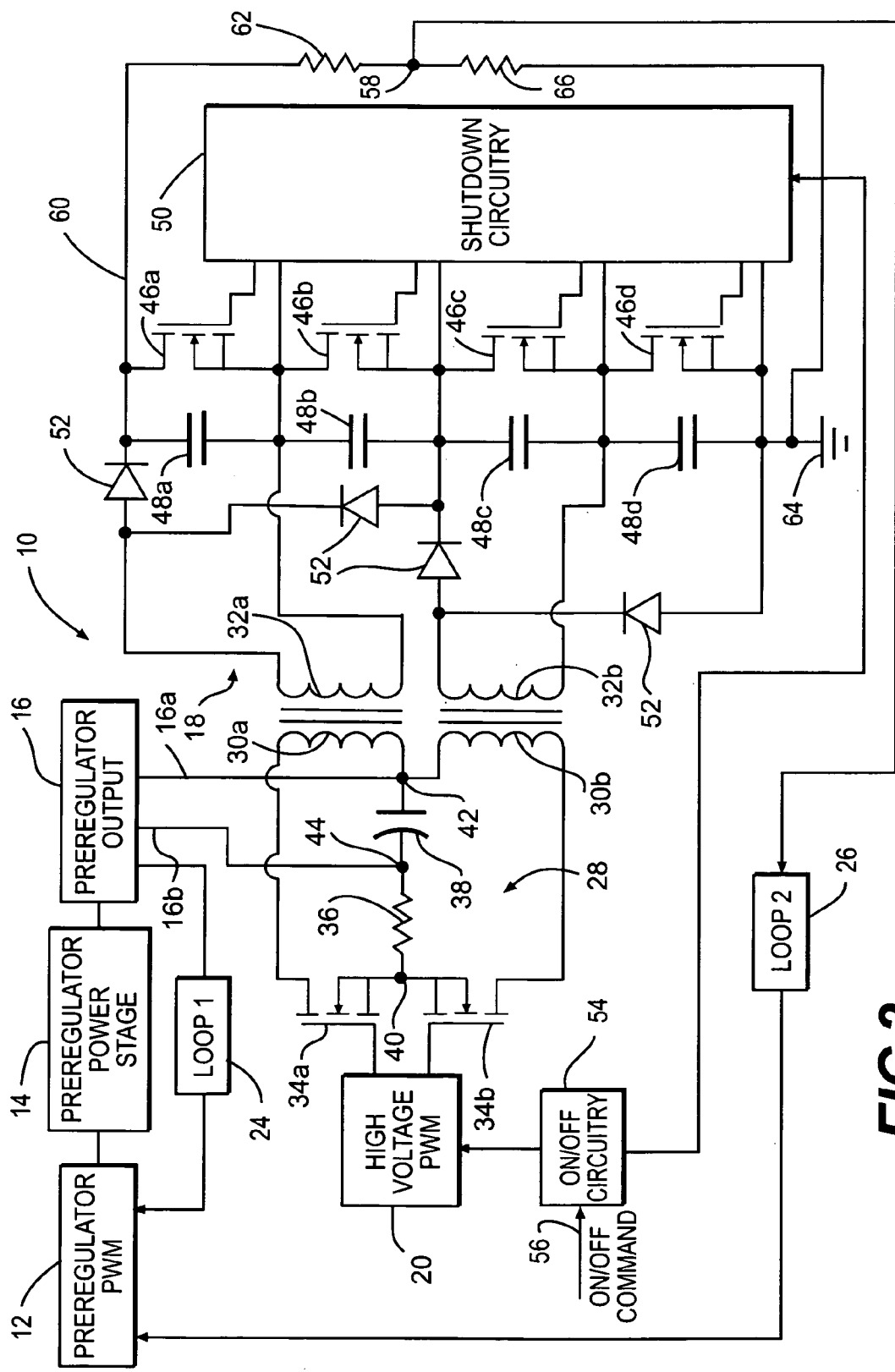
FIG. 2 is a part-block diagram, part-circuit diagram of the power supply of FIG. 1 showing a preferred embodiment of the circuitry of the high voltage power supply stage.

Turning to FIG. 2, as described above, the preregulator stage 10 includes a preregulator PWM 12 connected to a preregulator power stage 14 which is, in turn, connected to (i.e., includes as its output) a preregulator output 16. It will be appreciated that the showing in FIGS. 1 and 2 of preregulator stage 10 is schematic in nature, and that, for example, the output 16 has been shown separately for illustrative purposes.

As shown in FIG. 2, output connections 16a and 16b of preregulator output 16 are connected to a transformer circuit 28 which includes first and second primary windings 30a and 30b and first and second secondary windings 32a and 32b. A pair of field effect transistors (FETs) 34a and 34b are connected to the outputs of high voltage PWM 20 and a series-connected resistor 36 and a capacitor 38 are connected between a junction 40 between FETs 34a and 34b and a junction 42 between primary windings 30a and 30b. As illustrated, preregulator output connection 16a is connected to junction 42 while preregulator output connection 16b is to a junction 44 between resistor 36 and capacitor 38. Resistor 36 is used to limit the current by controlling the drive voltage of the FETs 34a and 34b during turn on of the high voltage PWM 20.

Transformer circuit 28, with the two sets of primary and secondary windings 30a, 32a and 30b, 32b, forms two voltage doublers. The secondary circuit of power stage 18 includes four FETs 46a, 46b, 46c and 46d and four capacitors 48a, 48b, 48c and 48d. More specifically, the four FETs are individually connected across respective ones of the four series connected capacitors 48a, 48b, 48c, and 48d, as shown. Switching of FETs 46a, 46b, 46c and 46d is controlled by a shutdown circuit (shutdown circuitry) 50. Four diodes 52 are connected as shown.

Off-on circuitry 54, which receives an off-on command indicated at 56, controls operation of both the shutdown circuit 50 and the high voltage PWM 20.

A fraction of the output voltage of power stage 18 appears at output terminal 58 which is connected to the high voltage side 60 through a first resistor 62 and to ground, indicated at 64, through a further resistor 66. Output terminal 58 is connected to the preregulator PWM 12 through the aforementioned feedback loop 26 so as to regulate the output voltage of power stage 18.

In a specific implementation, the high voltage power supply of FIGS. 1 and 2 has a rise time of less than 100 µs and a fall time of less than 100 µs. The power supply is programmable from 20V to 1250 V with an output current capability of at least 300 µA at 1250V. By applying a 0–5V square wave to the on/off command 56, a 20 to 1250V square wave will be produced at the output.

In one important application, the power supply can be used to electronically shutter a microchannel plate (MCP) intensified charge coupled device (CCD) by controlling the accelerating voltage across the MCP. For this application, this voltage can be as high as 1250V and needs to be turned on and off with rise times and fall times on the order of 100 ms (i.e., the rise and fall times described above) in order to accommodate exposure times as short as 1 ms. It will be appreciated from the foregoing that, in general, the power supply can be used commercially in any applications wherein high voltage with high slew rates are needed.

Although the invention has been described above in relation to preferred embodiments thereof, it will be understood by those skilled in the art that variations and modifications can be effected in these preferred embodiments without departing from the scope and spirit of the invention.

What is claimed:

1. A low power, high voltage power supply system, said power supply system comprising:
   a high voltage power supply stage;
   a preregulator for programming the power supply stage so as to produce, at an output thereof, an output voltage which is a predetermined fraction of a desired voltage level;
   said power supply stage including a high voltage stage connected to receive the output voltage from the preregulator and for, when activated, providing amplification of said output voltage to said desired voltage level so that a voltage of said desired voltage level is presented at an output terminal of said power supply stage;
   a first feedback loop connected between said output of said preregulator and an input of said preregulator; and
   a second feedback loop connected between said output terminal of said power supply stage and said input of said preregulator.

2. A power supply system according to claim 1 wherein said power supply stage includes a high voltage pulse width modulator for controlling amplification of the output voltage of said preregulator supplied to said power supply stage.

3. A power supply system according to claim 2 wherein said power supply stage includes a voltage doubler circuit comprising first and second voltage doublers.

4. A power supply system according to claim 3 wherein said voltage doubler circuit includes a transformer having first and second primary windings and first and second secondary windings.

5. A power supply system according to claim 4 wherein said voltage doubler circuit includes first and second electronic switches which are turned on and turned off under the control of said high voltage pulse width modulator.

6. A power supply system according to claim 5 wherein said first and second switches each comprises a field effect transistor.

7. A power supply system according to claim 5 further comprising a series combination of a resistor and capacitor connected between a junction between said first and second electronic switches and a junction between said first and second primary windings of said transformer, output connections from said preregulator being connected across said capacitor, and said resistor serving to limit current flow in the voltage doubler circuit by controlling the drive voltage of the first and second electronic switches during turn on of said electronic switches.

8. A power supply system according to claim 5 wherein said high voltage power supply stage further comprises a first capacitor connected across the first secondary winding, a second capacitor connected across the second secondary winding, a third capacitor connected in series between said first and second capacitors and a fourth capacitor connected in series with the first, second and third capacitors between the second capacitor and ground, an electronic control switch connected across each of said first, second, third and fourth capacitors for controlling discharging of said capacitors to produce said desired voltage at said output terminal of said high voltage power supply stage, and a control circuit for controlling switching of the electronic control switches.

9. A power supply system according to claim 8 further comprising on/off circuitry connected to said high voltage pulse width modulator and said control circuit for controlling activation thereof.

10. A power supply system according to claim 1 wherein said preregulator includes a preregulator pulse width modulator, and said first feedback loop is connected to an input of said preregulator pulse width modulator.

11. A low power, high voltage power supply apparatus comprising:
a high voltage power supply; and
a preregulator for programming the power supply to provide an output voltage which is a predetermined fraction of a desired output voltage, said preregulator comprising a preregulator pulse width modulator, a preregulator power stage and a preregulator output;
said high voltage power supply having a high voltage output activated after the desired output voltage is set and including a high voltage power stage, connected to the preregulator output, for providing amplification of the output voltage produced by the preregulator to the desired output voltage; and
said power supply apparatus further comprising a first feedback loop connected between the preregulator output and the preregulator pulse width modulator for controlling the output of the preregulator; and
a second feedback loop connected between said high voltage output of the high voltage power supply and the preregulator pulse width modulator for controlling the high voltage output after the high voltage output is activated.

12. A power supply system according to claim 11 wherein said high voltage power supply includes a high voltage pulse width modulator for controlling amplification of the output voltage of said preregulator supplied to said high voltage power supply.

13. A power supply system according to claim 12 wherein said high voltage power supply includes a voltage doubler circuit comprising first and second voltage doublers.

14. A power supply system according to claim 13 wherein said voltage doubler circuit includes a transformer having first and second primary windings and first and second secondary windings.

15. A power supply system according to claim 14 wherein said voltage doubler circuit includes first and second electronic switches which are turned on and turned off under the control of said high voltage pulse width modulator.

16. A power supply system according to claim 15 wherein said first and second switches each comprises a field effect transistor.

17. A power supply system according to claim 15 further comprising a series combination of a resistor and capacitor connected between a junction between said first and second electronic switches and a junction between said first and second primary windings of said transformer, output connections from said preregulator being connected across said capacitor, and said resistor serving to limit current flow in the voltage doubler circuit by controlling the drive voltage of the first and second electronic switches during turn on of said electronic switches.

18. A power supply system according to claim 15 wherein said high voltage power supply further comprises a first capacitor connected across the first secondary winding, a second capacitor connected across the second secondary winding, a third capacitor connected in series between said first and second capacitors and a fourth capacitor connected in series with the first, second and third capacitors between the second capacitor and ground, an electronic control switch connected across each of said first, second, third and fourth capacitors for controlling discharging of said capacitors to produce said desired voltage at said output terminal of said high voltage power supply stage, and a control circuit for controlling switching of the electronic control switches.

19. A power supply system according to claim 18 further comprising on/off circuitry connected to said high voltage pulse width modulator and said control circuit for controlling activation thereof.

* * * * *